United States Patent
Lyles et al.

(10) Patent No.: US 11,951,650 B2
(45) Date of Patent: Apr. 9, 2024

(54) PROTECTIVE HEMP OIL FOR WOOD TREATMENT METHOD

(71) Applicant: Smart Green Utility Pole, LLC., Hagerstown, MD (US)

(72) Inventors: Terry Lyles, Wellington, FL (US); Michael Baughman, Hagerstown, MD (US); Hollis Ervin, Pineville, LA (US)

(73) Assignee: Smart Green Utility Pole, LLC., Hagerstown, MD (US)

( * ) Notice: Subject to any disclaimer, the term of this patent is extended or adjusted under 35 U.S.C. 154(b) by 0 days.

(21) Appl. No.: 17/815,501

(22) Filed: Jul. 27, 2022

(65) Prior Publication Data

US 2023/0044862 A1 Feb. 9, 2023

Related U.S. Application Data

(60) Provisional application No. 63/226,565, filed on Jul. 28, 2021.

(51) Int. Cl.
| | |
|---|---|
| *B27K 3/34* | (2006.01) |
| *B27K 3/02* | (2006.01) |
| *B27K 3/08* | (2006.01) |
| *C09D 15/00* | (2006.01) |

(52) U.S. Cl.
CPC .............. *B27K 3/34* (2013.01); *B27K 3/0214* (2013.01); *B27K 3/08* (2013.01); *C09D 15/00* (2013.01); *B27K 2240/20* (2013.01)

(58) Field of Classification Search
CPC . B27K 3/163; B27K 3/26; B27K 3/34; A01N 59/20
See application file for complete search history.

(56) References Cited

U.S. PATENT DOCUMENTS

| | | | |
|---|---|---|---|
| 5,460,751 A * | 10/1995 | Ma | B27K 3/26 252/400.5 |
| 9,681,660 B2 * | 6/2017 | Murray | B27K 3/163 |
| 2013/0022829 A1 * | 1/2013 | Marx | A01N 59/20 428/541 |

\* cited by examiner

*Primary Examiner* — Dah-Wei D. Yuan
*Assistant Examiner* — Andrew J Bowman
(74) *Attorney, Agent, or Firm* — Michael L. Greenberg, Esq.; Greenberg & Lieberman, LLC

(57) ABSTRACT

A protectant and sealant solution and method of use thereof, configured to protect wood from premature decay when disposed in contact with the earth. The solution is composed of processed hemp oil which is mixed with bio-diesel and other oils to form the protectant solution. The wood is then impregnated with the solution via pressure treatment within a retort cylinder. The solution is configured to protect utility poles and other wooden construction members which are known for prolonged contact with soil. The solution is designed as a safe replacement for pentachlorophenol solutions which have been found to be harmful to the soil and water table.

8 Claims, 3 Drawing Sheets

PROTECTIVE HEMP OIL FOR WOOD TREATMENT METHOD

This application is a non-provisional application of provisional patent application No. 63/226,565, filed on Jul. 28, 2021, and priority is claimed thereto.

FIELD OF THE PRESENT INVENTION

The present invention relates to the field of wood protection solutions, and more specifically relates to a hemp oil-based solution, and method of use thereof, configured to imbue wood with anti-fungal properties configured to coat and protect the wood such that it prevents premature decay when placed in contact with the earth.

BACKGROUND OF THE PRESENT INVENTION

Wood, a biological polymeric structure occurring in nature, presents a complex designed network consisting of intimately associated biopolymers, which is adaptable to continuously changing environmental conditions (Fengel and Wegener 2003; Fratzl and Weinkamer 2007). Wood's constitutive biopolymers (cellulose, lignin, hemicelluloses) are subjected to intense and progressive oxidative degradation processes (photo-oxidation, chemical oxidation, thermal decomposition, photolysis reactions) under the action of environmental factors such as sunlight radiation, mainly UV component moisture generated through dewing, raining, and snowing and heat/cold variations (Fengel and Wegener 2003; Fratzl and Weinkamer 2007).

This affects wood's native durability (dimensional stability, surface integrity) and causes the occurrence of significant structural and color changes, along with a progressive reduction of its resistance against biological agents (biodegradation or decay development). The use of natural products in stringent industrial applications is largely determined by the efficacy of the formulation and the application of the preservative to successfully address inherent issues of weathering and biological factors such as fungal decay and termites.

Wood protection and preservation is a primary segment of the forest products industry which provides a positive vehicle for sustainable forestry. By extending the life of wood products far beyond that of the natural durability, the wood preservation industry acts as a major contributor to improving the environment, especially in regard to maintaining the forests of the world. Despite the many positive contributions of wood preservation, there is a continuing concern regarding the process of treating wood, namely relating to the loss of chemicals used in the treatment process during service, as well as the ultimate disposal of the treated products at the end of service life.

Increasingly, industrial hemp has found use cases in wide ranging industries. It is known that hemp grows to 13 feet within 100 days, making it one of the fasted CO2-to-biomass conversion tools available. Industrial hemp has been reported to contain over 500 natural constituents, 120 of which correspond to the cannabinoid class. The rest of *Cannabis* phytochemicals include primary metabolites such as amino acids, fatty acids, and steroids or secondary metabolites as terpenoids, flavonoids, stilbenoids, lignans, and alkaloids among others. Industrial hemp and solutions containing industrial hemp in this invention, do not contain THC in concentrations of 0.3% or greater by analysis and by definition. Analyzes were done by GC and GC/MS In all cases, the THC concentration is an order of magnitude lower than the 0.3% limit with concentrations below method detection limit (BMDL) in most cases.

Hemp has been noted as a redeemable replacement for many plastics made from petroleum. Recently, it has been found that certain hemp oils can function as a protectant, for natural, carbon-based products such as wood.

Unfortunately, currently and previously used wood protectants such as Pentachlorophenol or "Penta" chemical solutions are incredibly harmful to the environment, namely the soil and the water table. These solutions have been used to protect wood from natural decay, enabling the use of wood for utility poles, fences, and similar construction projects in which wood has direct contact with the earth. If there were a way in which a new solution could be provided to protect wood and similar organic construction materials from premature decay without harming the water table and soil, wood could continue to be used for long term installations safely.

Until recently, little study had been conducted on the efficacy of hemp oils as an anti-fungal, anti-decaying agent. It has now been recognized that certain concentrations and combinations of hemp oil can serve as a natural wood protection solution which maintains the efficacy of Penta solutions while being safe for use in the environment. Further, it has been widely documented that hemp oils have antibacterial properties. Hemp oil has also been proven to be effective as a wood preservative; however a process of implementation and application is required.

Thus, there is a need for a new chemical solution, composed in part of hemp oil, and accompanying method of application, which may be used as a sealant and protecting solution for wood configured for use in an outdoor environment in contact with the earth. Such a solution is preferably configured to be pressure impregnated into the wood via a retort cylinder. The resistance of wood treated by this Hemp solution to wood destroying agents has been exhibited in extensive testing done by a leading university that has long been a leader in the field of wood and wood protection research and well known both nationally and internationally. Testing done at a variety of concentrations has shown exceptional decay resistance in samples treated with industrial hemp oil and industrial hemp oil solutions.

SUMMARY OF THE PRESENT INVENTION

The present invention is a hemp oil-based solution and method of use thereof for the treatment of outdoor wooden construction products. The solution is preferably available in differing concentrations for different applications. Other oils are present in the solution which comply with the hydrocarbon solvent standards of the American Wood Protection Association. The wood is impregnated with the solution under pressure, pressure treating the wood with the hemp oil solution.

The present invention relates generally to the use of hemp oil and mixtures of hemp oil in a wood impregnation regime and, ultimately, the internal and external preservation of wood with the natural decay resistance of hemp oil and the polymerization of hemp oil and its constituents in the wood to bond with the wood substrate and decrease the accessibility of the wood components to the decay organisms.

The hemp treating solution of the present invention is comprised of industrial hemp components in a carrier solvent. The hemp component of the treating solution is derived from industrial hemp containing a complex mixture of compounds that have been shown to have preservative properties. These industrial hemp solutions contain a number of cannabinoids, triglycerides, and polyunsaturated fatty acids that have been documented to have preservative properties.

The following brief and detailed descriptions of the drawings are provided to explain possible embodiments of the present invention but are not provided to limit the scope of the present invention as expressed herein this summary section.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein.

DETAILED DESCRIPTION OF THE PREFERRED EMBODIMENT

Figure 1:
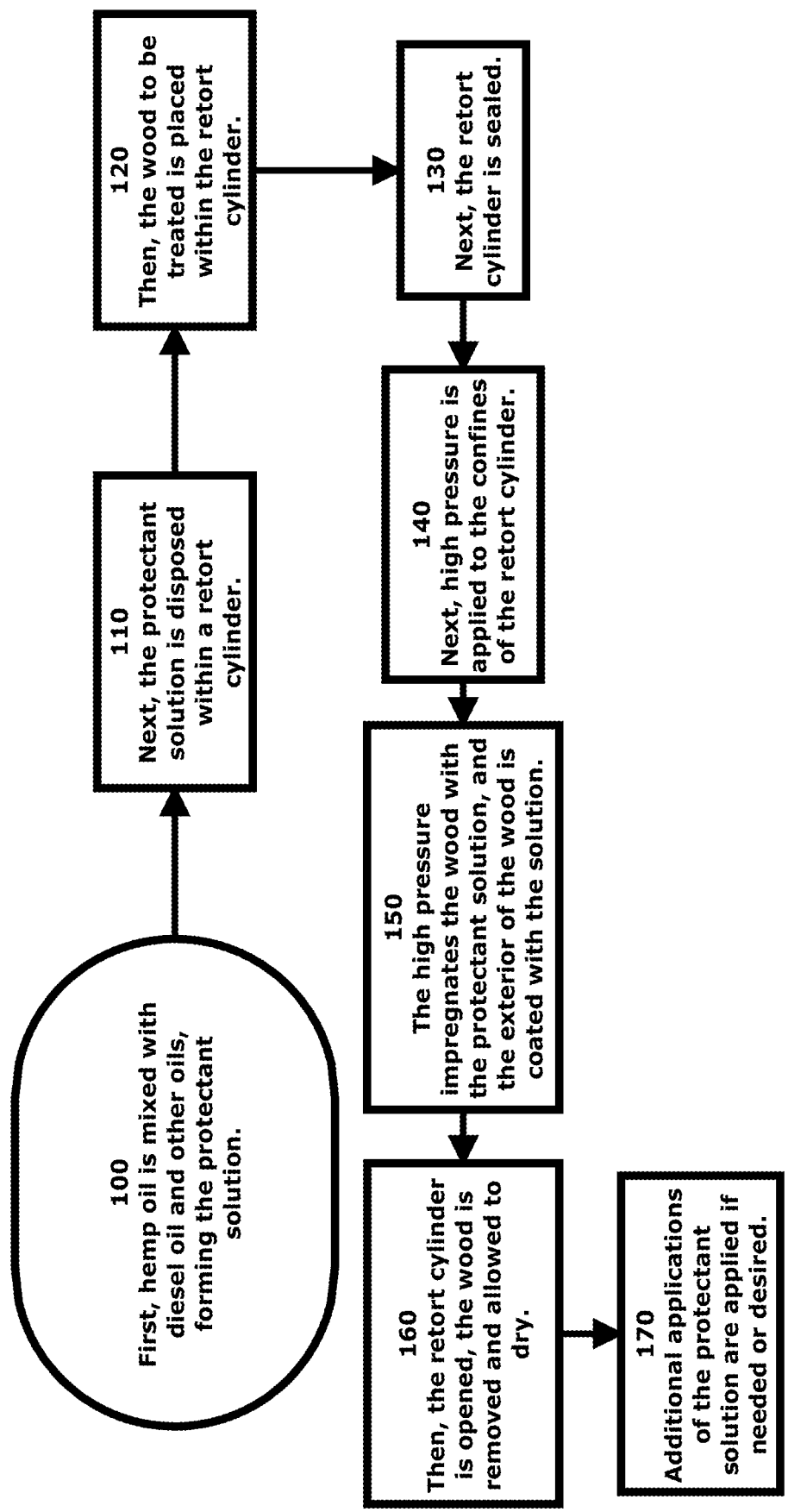
FIG. 1 shows a flow chart detailing the process of use of the present invention by a user.

The present specification discloses one or more embodiments that incorporate the features of the invention. The disclosed embodiment(s) merely exemplify the invention. The scope of the invention is not limited to the disclosed embodiment(s).

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The present invention is a wood treatment solution and method configured to facilitate the protection of wood against premature decay. The solution is hemp oil-based, and is preferably a mixture of at least the following oils: hemp oil, diesel oil, bio-diesel oil, and small quantities of stabilizing oils. Strengths of the hemp-oil in the solution is preferably 5%, 10%, or 15% (+/−) hemp oil, with the remaining portion of the solution composed of bio-diesel oil and/or other oils. Solutions may be available in other ratios of hemp oil to bio-diesel oil, however it has been found that increases in protection diminish after 15% hemp seed oil. The hemp oil used in the solution of the present invention is preferably processed hemp seed oil. The carrier solvent can be a petroleum-based oil or a number of natural oils, such as bio-diesel. The specific gravity of the solution should be well below that of water to facilitate good gravimetric separation from any residual water accumulated during treating. Miscibility and/or complete mixing of the hemp oil component in the carrier solvent should occur indicating formation of a true solution.

The hemp oil solution of the present invention is preferably impregnated into the wood using conventional pressure treatment practices. A retort cylinder is preferably used as the kiln-dried wood is immersed in the solution of the present invention, treating the entirety of the wood. Woods suitable for treatment include beams, poles, columns, and boards, however preferred embodiments of the present invention are envisioned for use as a treatment for utility pole which are known to remain in contact with the earth for its entire use. The entirety of the pole is preferably treated with the solution, not only the portion configured to rest below the groundline of the installation.

To impregnate wood with the solution of the present invention, the solution is applied to the wood under a vacuum/pressure regime to drive the hemp solution into the wood. This can be accomplished in a number of ways, including the Bethell full cell process utilizing a deep initial vacuum, the Lowry empty cell process utilizing initial air pressure at atmospheric, the Rueping empty cell process utilizing increased initial air pressure above atmospheric, and the modified full cell process utilizing a partial initial vacuum. For example, the basic modified full cell process for southern pine is:

| PROCESS STEP | PRESSURE/ VACUUM | TIME (min) |
|---|---|---|
| Initial vacuum | 10 inches HG | 15 |
| Fill cylinder | | 15 |
| Impregnation | Less than or equal to 150 PSI | (until gross injection target is reached) |
| Empty cylinder | | 15 |
| 1st Final Vacuum | 24 inches HG Minimum | 45 |
| Vent | | 5 |
| 2nd Final Vacuum | 24 inches HG Minimum | (until net injection target is reached) |
| Purge | | 15 |
| Final Empty | | 10 |

It should be noted that other combinations of vacuum and pressure may be utilized at times dependent upon the species of wood, the condition of wood to be treated, and the net gauge retention required.

The treating process is accomplished in an autoclave (retort) cylinder where the wood to be treated is immersed in preservative solution. Prior to immersion, the wood is subjected to a partial vacuum to evacuate some air from the wood. Typically, after the initial vacuum step, a sufficient volume of preservative is forced into the wood with pressure of sufficient magnitude necessary to accomplish preservative penetration consistent with industry standards for the species of wood in question. After impregnation of the solution into the wood, the cylinder is emptied of solution and the wood is subjected to two final vacuum stages to allow equilibration of internal pressures with atmospheric. This accelerates any kickback of preservative in the cylinder whereby minimizing exudation of preservative after removal from the treating cylinder.

The process of installation and use of the system and apparatus of the present invention, as shown in FIG. 1, is preferably as follows:

1. First, hemp oil is mixed with bio-diesel oil and/or other oils, forming the protectant solution. (100)

2. Next, the protectant solution is disposed within a retort cylinder. (110). Wood to be treated is first conditioned. It is kiln dried below the fiber saturation point to remove free water from the cell lumen in preparation for treatment. Special care should be taken to ensure the wood surface to be free from heavy concentrations of particulates and/or surface deposits that could impede the radial flow of preservative solution into the wood.
3. Then, the wood to be treated is placed within the retort cylinder. (120)
4. Next, the retort cylinder is sealed. (130)
5. Next, high pressure is applied to the confines of the retort cylinder. (140) The pressure remains for a required minimum duration as specified by the species of wood, and its ultimate end-use application. Primarily, the end-use application of the wood determines the concentration of solution applied, as well as the duration of the pressure application.
6. The high pressure impregnates the wood with the protectant solution, and the exterior of the wood is coated with the solution. (150)
7. Then, the retort cylinder is opened, the wood is removed and allowed to dry. (160)
8. Additional applications of the protectant solution are applied if needed or desired. (170)

It should be noted that higher concentrations of the solutions may be prudent for use in high decay hazard zones as is typical of other preservative systems. These processes are applicable to lumber, timbers, posts, poles, piling and other wood products generally treated for industrial or residential use in both ground contact and above ground contact applications. Other combinations of vacuum and pressure may be utilized at times dependent upon the species of wood, the product being treated, the condition of wood to be treated, and the net gauge retention required. Additionally, it should be noted that the solution of the present invention is also suitable for treatment of lumber configured for use as deck supports, wooden compost bin construction, fence post, and similar wood-to-soil installations.

In some embodiments of the present invention, multiple instances of the pressure treating process may be required. In other instances, a supplemental surface coating may be used.

Post-treatment conditions can further promote the polymerization of the hemp solution in-situ to fix the solution and any components or additives carried by the solution with the wood substrate. After removal of the wood from the retort cylinder, the treated wood should be held a few days to allow this to begin to occur. Once polymerization is initiated in the wood, it generally will continue until complete. It is known that when the outer coat of the wood treated with hemp solution is breached, the less fully polymerized hemp solution components retained in the interior migrates to the surface. As it reaches the surface, it is exposed to the air where oxidation begins which results in the polymerization of solution components to the wood substrate. Also, depending upon the atmospheric conditions of the manufacturing plant, it may be advantageous to heat the solution immediately prior to treatment to accelerate the rate of oxidation and subsequent reactions once the wood is treated.

For surface applications, similar solutions of industrial hemp oils and carrier solutions are applied to the wood surface allowing a few hours between applications. It is important to provide a solid surface coat of oil to seal the wood. Prevailing mechanisms for the surface applications are similar to those previously described. As the hemp solution on the exterior surface of the treated wood polymerizes, it hardens creating a layer of protection to the exterior of the wood imparting some water resistance and weathering resistance to the wood substrate, however the method of impregnation previously described yields better results.

It should be understood that the solution and method of the present invention may be configured for use on home-use wood products as a protectant/sealant for above ground lumber applications.

Testing of Treatment Efficacy

The below describes efficacy testing which was conducted to determine the most effective ratio of solution (hemp seed oil to bio-diesel oil) for the desired effect of maximizing the service life of wood.

Soil Block Testing

To prepare the soil block test beds, the AWPA E 10-16 standard was followed, with a substitution of plastic containers for French square jars. The water holding capacity of the sieved, autoclaved soil was verified. To the 150 g of soil, approximately 70 ml of water was added. A 2-inch southern pine feeder strip was placed in the center of each container and plugs of *G. trabeum* were inoculated onto the soil immediately adjacent to the long sides of each feeder strip. Inoculated containers were maintained at 27 degrees C. for 14 days to allow the fungal inoculum to become established on the feeder strip. At 14 days, test containers with the most fungal growth were selected to receive treated blocks.

A total of 10 blocks were placed into glass containers, which were placed into a bench-scale treatment cylinder. Treating solutions filled each glass container so that the blocks were completely submerged. A vacuum was pulled in the sealed cylinder and allowed to remain 15 minutes to purge air from the blocks. After 15 minutes, the vacuum was released and the blocks were allowed to soak in the respective solutions for 15 minutes. After 15 minutes the surface wetness was blotted away and the weight for each block was recorded. Blocks were allowed to continue drying at ambient temperature and humidity until a stable weight was reached. From each treatment group, five blocks were selected for testing based on the weight and treatment uptake.

Treated blocks were placed onto inoculated feeder strips in containers and placed back into an incubator at 27 degree C. for eight weeks. Growth was visually inspected for contamination and/or drying issues and no issues were observed. At the end of the eight-week test period, containers were removed from the incubator, test blocks were retrieved, cleaned of fungal growth and placed onto a drying rack. Blocks were dried for several days until they reached equilibrium. Final weights were taken and percentage mass change was determined.

Mass change in the unprotected water controls average 36%, indicating that the fungal culture used in the test is consuming wood as an energy source and the wood provided no impediment to its progression. A 30-40% mass loss average is considered to be an acceptable standard for unprotected southern pine blocks in soil testing.

All treatment groups other than the water control indicated the potential to restrict fungal growth. It was noted that there is a direct correlation between sample mass gain and concentration of hemp seed oil in the solutions.

Pole Decay Modeling

Previous testing with standard soil block test methodology using 14 mm southern pine and the brown rot fungi Glocophyllum trabeum indicated no detectable mass loss in samples treated with SGUP proprietary oil-based system after 8 weeks. Three treating solutions and two control sets were included in the experimental design, including a water only control, a P9 carrier oil control, and treatments at 33%, 66%, and 100% Hemp seed oil in carrier oil.

Since the goal of the treatments development is to design a system for the treatment of utility poles, testing a sample geometry more representative of a pole was agreed to by SBP staff and SGUP representatives. The stages discussed were: 1) lab scale modeling of treatment followed by decay and termite evaluations 2) eventual field scale studies with 18-inch treated stakes. Lab scale testing was based on AWPA E 14-16 method for Rapidly Evaluating the Decay Resistance of Wood based materials in Ground contact. Soil test beds were prepared consistent with AWPA E 14-16. Sections of agar-grown *G. trabeum* decay fungi were added to the soil surface and allowed to colonize the soil for a minimum of 14 days.

Growth of fungal inoculum and preparation of treated samples occurred during the same time period. Treatment groups were placed in a cylinder under vacuum for 20 minutes followed by 20 minutes submerged in the solution. (Treatment tests were performed preliminarily to determine time needed for penetration and retention.) Following treatment, samples were dried at 40 degrees C. in a forced air oven to a stable weight. The treated samples were introduced vertically into the soil beds to a depth of 2 inches.

Soil bed containers were housed in an incubator for fungal analysis at 22-28 degrees C. with no internal lights. Each container was covered with a layer of aluminum foil and allowed to exchange moisture and air inside the incubator. Moisture content was maintained at an appropriate level to maintain fungal growth (30-50%) and confirmed weekly. Mass loss was minimal in all treated samples.

Both the 33% and 66% samples showed a slightly higher mass loss than the 100% sample. The 100% samples averaged 1.3% weight loss, while the 33% and 66% samples averaged 1.8% and 1.9% respectively.

From the results, there was little difference in weight loss with the changes in concentration. Therefore, the results would suggest that considerably lower concentrations would also behave favorably.

Accelerated Weathering

Here, the university was engaged to perform accelerated weathering tests on a number of formulations for topical use. Procedures and results are summarized below.

A part of their routine evaluation procedures, the university houses an accelerated weathering testing machine, which has been used to successfully analyze the weathering potential of numerous wood products for many years. Specifically, this methodology is used during investigations of coatings and paints that aim to reduce or eliminate wood swelling and shrinking, and damage to coatings and paint from heat and water.

Testing is based on similar procedure conducted by Temiz, et al (2005) which determined surface and color changes in preservative-treated wood. For the proposed test, samples of SYP were prepared from a larger board, cut to sample size 1"×4"×3" in the wood shop. Students weighed test pieces into similar groups, and selected five from each group for coating. Solutions provided by SGUP were applied by brush to all surfaces of test pieces, and allowed to air dry for 24-48 hours. A second coat was applied, an accepted industry standard practice, and the pieces dried for an additional 24-48 hours. Weights and dimensional measurements were taken and recorded. Uncoated SYP samples were included as controls, along with an alkyd-acrylic product that is known to perform well in weathering tests and a solvent-only control group (Bobadilha et al, 2021).

A cycle of 8 hours of UV light and heat (approximately 100° F.) were followed immediately by water misting for 16 hours. These cycles continued for the duration of testing. Each day, samples were randomly reassigned to a different position within the weathering chamber. Weights and dimensional measurements were taken at 0, 7 days, and 14 days of exposure (approximately 0 hours, 168 hours, and 336 hours). Daily task included rotating the samples randomly and monitoring of the weathering system.

At 7 and 14 days of exposure, samples were removed from the weathering apparatus, and examined for the following:

Weight

Dimensional variation (L/W/D with digital caliper)

Visual analysis such as cracking/checking/flaking/chalking of coated surfaces (ASTM standards)

Warp/cup/splitting of wood

Mold or mildew occurrence

Figure 2:
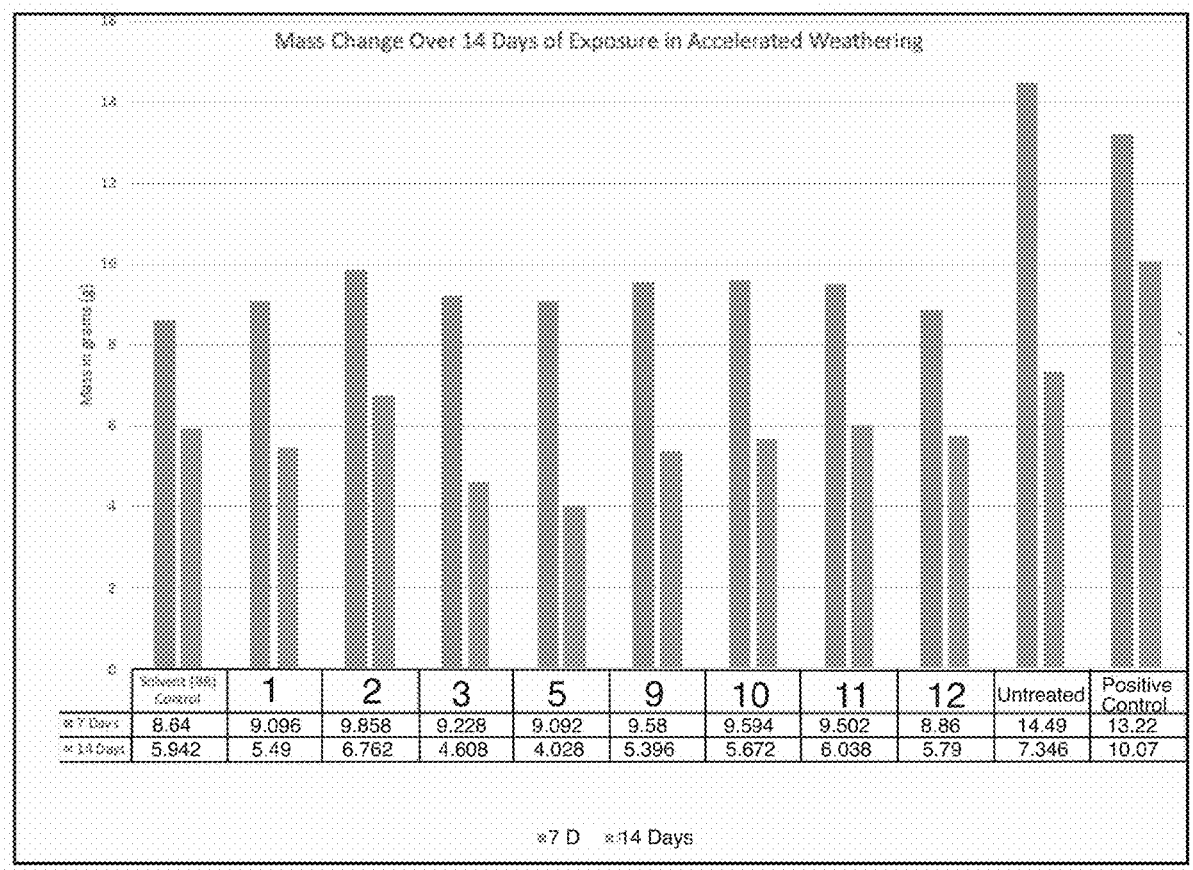
FIG. 2 shows a bar graph exhibiting the efficacy of the treatment method of the present invention in comparison to a control group.

Nine different solution formulations were tested. Also, solvent controls, positive controls and negative controls were Tested as well. Samples of 5, 10 and 15% hemp seed oil were mixed with solvents. These, and 4 different industrial hemp crude extractions were quantified regarding mass change at various stages during the weathering tests. These results were compared to an alkyd-acrylic product (positive control) that is known to perform well in weathering tests and a solvent-only control group. Mass Change results are shown in FIG. 2.

Figure 3:
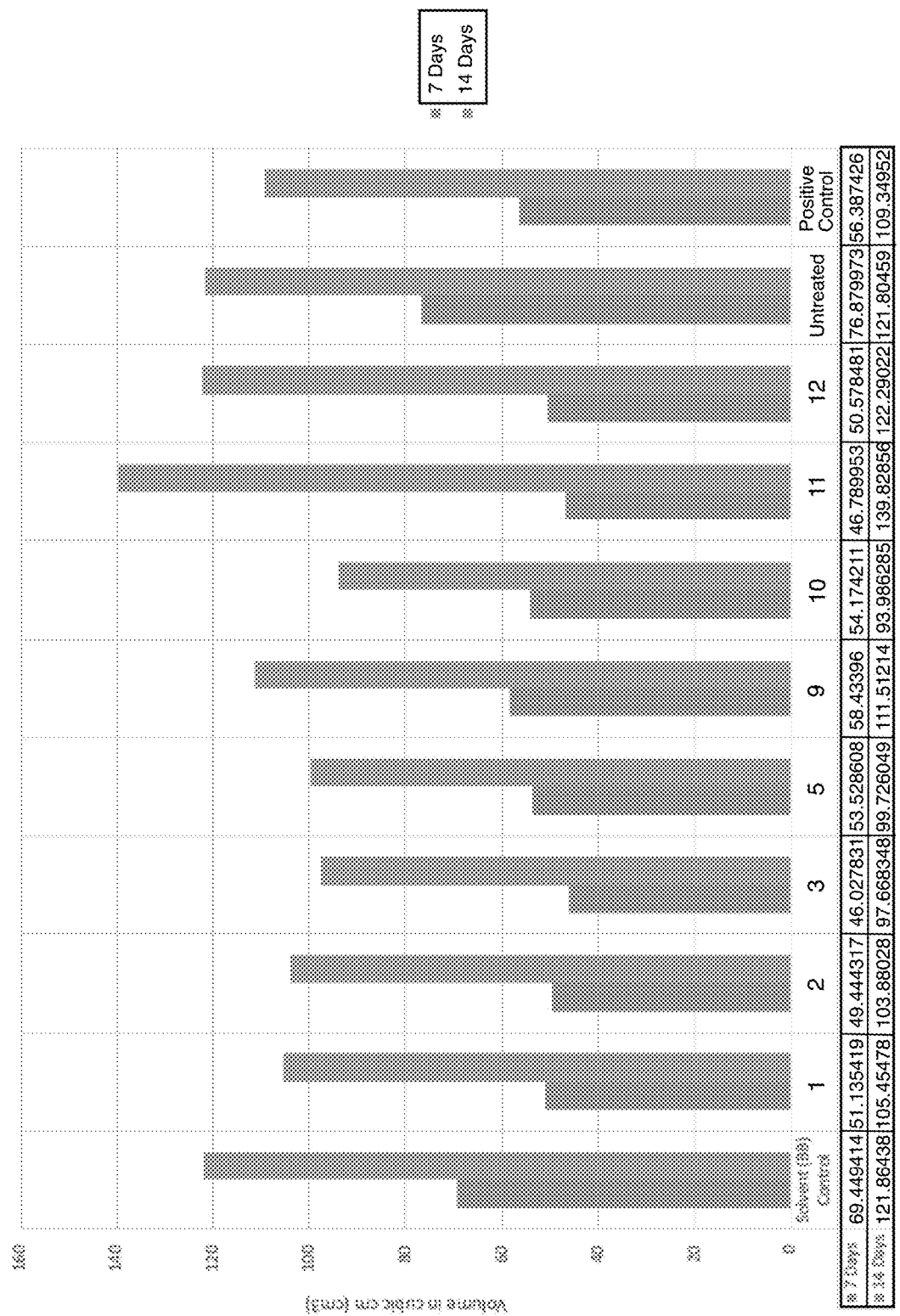
FIG. 3 is a bar graph detailing the dimensional variation of wood treated with the solution of the present invention at seven and 14 days of exposure.

In FIG. 3, the HSO BB samples were also favorable to the positive control on dimensional variation as was sample BB-3-5 HSO crude. It can be seen that in FIG. 3, samples 1, 2, 3, 5, and 10 all behaved favorably in comparison to the positive control. The negative control was untreated wood. The positive control was treated conventionally such that is known to perform well in weathering tests. As shown in FIG. 2, all samples performed favorably to the positive control. All samples were evaluated after weathering for surface issues including flaking, chalking, mold, mildew, cupping, and warpage. There were no issues on any of these. The only observation that was noted was a little end checking and this was present on all the samples and also the positive control. These were very small checks similar to the end checking that would occur as wood begins to season at moisture contents just below fiber saturation point.

For surface applications, similar solutions of industrial hemp oils and carrier solution are applied to the wood surface allowing a few hours between applications. It is important to provide a solid surface coat of oil to seal the wood. Prevailing mechanisms for the surface applications are similar to those previously described. As the hemp solution on the exterior surface of the treated wood polymerizes, it creates a layer of protection to the exterior of the wood imparting some water resistance and weathering resistance to the wood substrate.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

We claim:

1. A method of treating wood with natural solution to provide enhanced weathering protection and heightened decay hazard ratings comprising:
   drying the wood in a kiln, removing water from the wood, forming pre-treated wood;
   preparing the natural solution by mixing bio-diesel oil with hemp seed oil;
   wherein the solution is comprised of 100% of biodiesel and hemp seed oil;
   disposing the solution in a retort cylinder;
   placing the pre-treated wood into an interior of the retort cylinder;
   sealing the retort cylinder;
   the retort cylinder applying pressure to the pre-treated wood within the interior of the retort cylinder;
   the pressure impregnating the wood with the solution;
   the pressure covering an exterior of the wood with the solution, forming treated wood;
   opening the retort cylinder;
   removing the treated wood; and
   drying the treated wood.

2. The method of claim 1, wherein the solution comprised of 85% bio-diesel and 15% hemp seed oil.

3. The method of claim 1, wherein the solution comprised of 90% bio-diesel and 10% hemp seed oil.

4. The method of claim 1, wherein the solution comprised of 95% bio-diesel and 5% hemp seed oil.

5. The method of claim 1, wherein the pre-treated wood has a shape selected from the following group: a utility pole, a beam, a column, a board, and a post.

6. The method of claim 1, wherein the solution consists of 85% bio-diesel and 15% hemp seed oil.

7. The method of claim 1, wherein the solution consists of 90% bio-diesel and 10% hemp seed oil.

8. The method of claim 1, wherein the solution consists of 95% bio-diesel and 5% hemp seed oil.

* * * * *